United States Patent [19]
Circeo, Jr. et al.

[11] Patent Number: 5,276,253
[45] Date of Patent: * Jan. 4, 1994

[54] IN-SITU REMEDIATION AND VITRIFICATION OF CONTAMINATED SOILS, DEPOSITS AND BURIED MATERIALS

[76] Inventors: Louis J. Circeo, Jr., 4245 Navajo Trail, Atlanta, Ga. 30319; Salvador L. Camacho, 8913 O'Neal Rd., Raleigh, N.C. 27612

[*] Notice: The portion of the term of this patent subsequent to Jan. 26, 2010 has been disclaimed.

[21] Appl. No.: 944,890
[22] Filed: Sep. 9, 1992
[51] Int. Cl.⁵ .................. E02D 19/14; B09B 1/00
[52] U.S. Cl. ................... 588/253; 588/260; 405/128; 405/131; 405/269; 405/271
[58] Field of Search .............. 405/128, 129, 131, 130, 405/263, 258, 269, 271; 588/253, 252, 260

[56] References Cited
U.S. PATENT DOCUMENTS 4,376,598  3/1983  Brouns et al. .
4,776,409  10/1988  Manchak, Jr. .
5,011,329  4/1991  Nelson et al. .................. 405/131 X
5,100,259  3/1992  Buelt et al. .......................... 405/128
5,181,795  1/1993  Circeo, Jr. et al. ............. 405/258 X Primary Examiner—Randolph A. Reese
Assistant Examiner—J. Russell McBee
Attorney, Agent, or Firm—Olive & Olive

[57] ABSTRACT

A method is disclosed in which a plasma arc torch is used to vitrify and remediate a site containing contaminated soils, resulting from a hazardous material deposit or spill, or contaminated buried objects. The contaminated earthen material or subterranean deposit is pyrolyzed, melted or solidified by the plasma torch which is energized at the bottom of a cased, vertical borehole, and then gradually raised to the surface. An array of boreholes, appropriately spaced, will remediate an entire mass of contaminated material. Similarly, buried objects such as metal drums containing contaminants and underground storage tanks may be selectively remediated at their specific buried depth. Similar use is made of the plasma torch in a second embodiment with the additional step of processing at selected underground locations in the borehole array to create a sealed horizontal layer, vertical cutoff walls or a sealed basin as a barrier against further leaching of contaminants into surrounding soil and groundwater. Gaseous by-products of the pyrolysis process are collected, treated and processed, as appropriate.

18 Claims, 2 Drawing Sheets

IN-SITU REMEDIATION AND VITRIFICATION OF CONTAMINATED SOILS, DEPOSITS AND BURIED MATERIALS

FIELD OF INVENTION

The invention disclosed relates to the field of remediation and vitrification of soils containing hazardous materials at or beneath the surface of the earth.

REFERENCE TO RELATED APPLICATION

Two related copending applications provide useful background for the present application. One is U.S. patent application Ser. No. 07/827,384 filed Jan. 29, 1992 for "IN-SITU SOIL STABILIZATION METHOD AND APPARATUS", and the second is the application entitled "IN-SITU LANDFILL PYROLYSIS, REMEDIATION AND VITRIFICATION" filed Aug. 17, 1992.

BACKGROUND OF THE INVENTION

A serious contemporary problem is the accidental spilling or intentional discarding of toxic or environmentally hazardous materials comprising both organic and inorganic contaminants. These injurious materials may be liquid or solid, and may be at the ground surface or buried. When such a situation occurs, the land affected can be permanently destroyed for productive use, or at least until an expensive clean-up process is accomplished. In addition to the effect on the soil, such contaminating wastes often find their way into streams, rivers and municipal water supplies, causing untold damage and potential sickness. Such hazardous waste materials include, by way of example, petroleum products, chemicals, mine tailings, sludges, and low-level radioactive materials whether exposed or contained in metal drums or underground storage tanks.

The sort of clean up operations which have been done in the past have involved excavating the contaminated soils or objects, and transporting them to a treatment facility or to a safe storage site. Alternatively, means of remediating contaminated soil in-situ have been outlined in U.S. Pat. No. 4,376,598 to Brouns et al., for "In Situ Vitrification of Soil". The '598 patent teaches the insertion of two or more conductive graphite electrodes into the soil, providing a conductive electrical path on the surface of the soil, and generating a current through the electrical path to heat the surrounding soil to its melting temperature. Once a melted soil stream has been established between electrodes, the molten soil provides the conductive path. However, this method has several drawbacks; e.g., soil melting must begin at the ground surface and proceed downward, it cannot operate at deep depths or at selective depths, the continuity of the soil electrical path is not reliable, and restarting the current flow once the melt has moved below ground surface level is quite difficult. In addition, since processing temperatures are below 2000° C., soil additives may be necessary to lower the melting point of particular soils, and the method does not work well if there is too much metal or moisture in the soil.

The invention disclosed herein recognizes that there exists a relatively new technology which may be employed in the remediation of all contaminated soils or buried materials at any depth by the process of pyrolysis, melting and vitrification of waste materials using large quantities of very high temperature heat energy. The basic tool used in this technology is the plasma arc torch. Plasma arc torches can routinely operate at energy levels ranging from 100 kw to 10 MW. Plasma torches produce temperatures of 4000° C. to 7000° C. in the range of 85-93% electric to heat energy conversion efficiency. For purposes of comparison, the highest temperature attainable by fuel combustion sources or the aforementioned graphite electrode process is in the vicinity of 2700° C.

A plasma arc torch operates by causing a high energy electric arc to form a stream of plasma, or ionized gas, thus generating large amounts of heat energy. There are many types of plasma torches, but all torches generally fall into one of two basic categories according to the arc configuration relative to the torch electrodes, i.e., transferred arc type and non-transferred arc type. The arc of a transferred arc torch is formed by and jumps from a single electrode on the torch, through the plasma gas, and to an external electrode which is connected to the opposite electrical terminal. The arc of a non-transferred arc torch is formed by and jumps from one electrode on the torch along the plasma gas and back to another electrode on the torch.

In the plasma arc torch, the heat energy produced is proportional to the length of the arc, assuming the type of plasma gas and applied electrical current both remain constant.

Since the present invention makes use of a plasma arc torch, reference is next made to U.S. Pat. No. 4,067,390 granted to the present inventors for "Apparatus And Method For The Recovery Of Fuel Products From Subterranean Deposits Of Carbonaceous Matter Using A Plasma Arc" which patent teaches the use of a plasma arc torch to gasify or to liquify underground deposits of coal, oil, oil shale, tar sands and other carbonaceous materials. The teachings of the '390 patent are incorporated hereby by reference.

It is a major objective of the invention to afford an efficient and environmentally safe system for the in-situ remediation of soils containing hazardous materials and other buried contaminants such as metal drums of waste matter, underground storage tanks and other toxic deposits.

It is a further objective of the invention to prevent the leaching and spread of contaminated material to the surrounding soil medium and to the subterranean water system.

Additional objectives of the invention will become apparent from the disclosure which follows.

SUMMARY OF THE INVENTION

The invention disclosed utilizes plasma torch heating for the remediation by in-situ pyrolysis and vitrification of hazardous waste sites, spills or deposits buried at any depth below the ground surface. A series of boreholes are formed throughout a contaminated area in an array such that the perimeters of the vitrified, solidified or remediated columns which are formed will coalesce together. A plasma arc torch is inserted, energized and moved within each borehole so as to form a column of material which has been remediated by pyrolysis of the organic material in the soil and vitrification of the surrounding contaminated inorganic soils and buried materials. The gases generated in this process are collected at the top of each borehole and treated as required. Upon cooling, the molten mass solidifies into a dense, inert, vitrified mass which effectively immobilizes and neutralizes any remaining contaminants. Certain contaminants may be remediated within solidified or devolatilized zones which extend beyond the vitrified zone. In these situations, the borehole spacing would be increased.

DESCRIPTION OF THE PREFERRED EMBODIMENT

Figure 1:
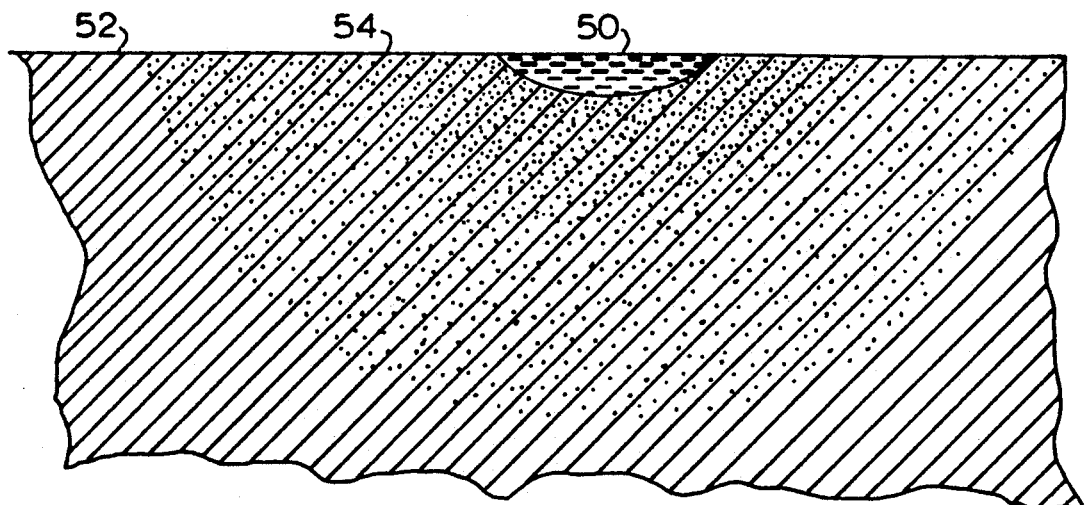
FIG. 1 is a sectional elevation view of a typical hazardous spill site showing the contaminated areas of soil radiating from the initial spill location into the surrounding soil.

The invention relates to the problem illustrated, by way of example, in FIG. 1, showing a spill of liquid material, hazardous waste 50, onto the upper surface of a section of earth. Over a period of time, the hazardous waste 50 leaches along the surface and into the ground 52, thereby creating contaminated area 54 which extends for some distance in all directions from the original site of the spill. Uncontaminated earth 52 beyond the contaminated area 54 is unaffected, although in sufficient time the leaching will typically continue until the contaminated area 54 encompasses a much larger area and could ultimately reach an underground aquifer which would permit the hazardous waste 50 to migrate along its path of flow. In other situations, the hazardous spill or deposit maybe a solid substance or a buried object, but its contaminating effect is also subject to leaching and migration into the surrounding earth and water with the aid of rain.

Figure 2:
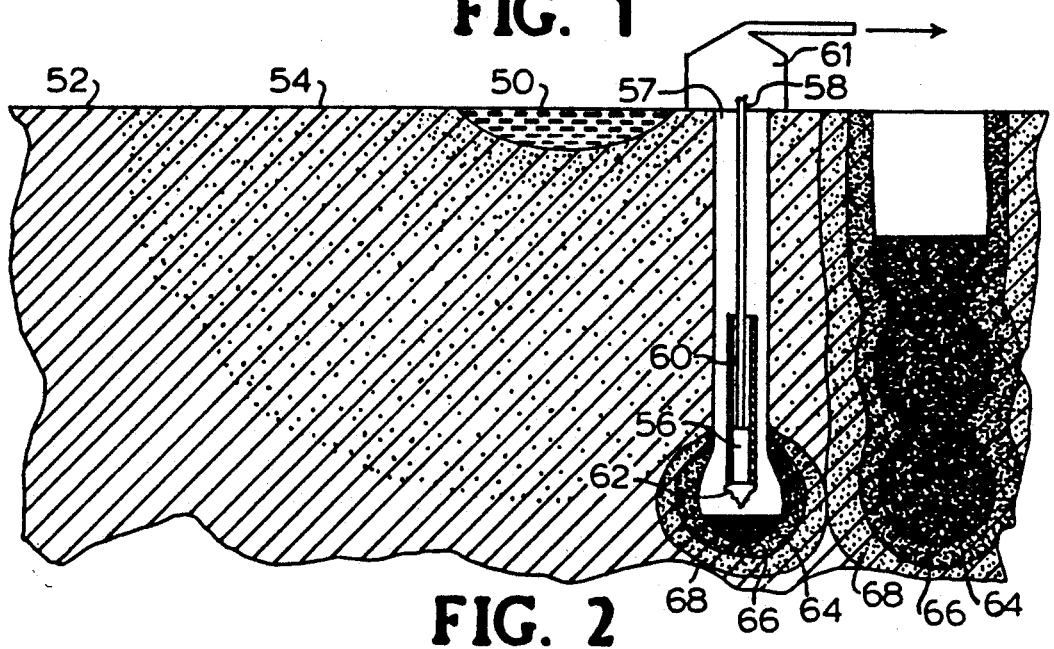
FIG. 2 is the view of FIG. 1 with an initial borehole formed into the earth, with a plasma torch inserted in the borehole and with a gas collector positioned above the borehole according to the invention.

As shown in FIG. 2, a borehole 57 is formed by drilling through the contaminated soil mass 54 to a point just below the maximum depth of contamination and a thin heat-destructible metal casing (not shown) is inserted into the hole. The metal casing serves to prevent collapse of the sidewalls of borehole 57, facilitate the up and down movement of plasma arc torch 56 within the borehole 57, and to permit gases formed by the pyrolysis process to quickly reach the surface for collection and treatment. Next, plasma torch 56 is lowered to a point near the bottom of borehole 57 and is suspended by supply conduit 58 which contains electrical cables, a plasma gas supply line and coolant water necessary for torch operation as described above. The process of lowering and raising plasma torch 56 is accomplished by means of appropriate lift equipment (not shown).

The torch 56 is also provided with a protective heat shroud 60 adapted to shield the supply conduit 58 from being damaged by the heat generated. In the treatment of shallow contaminated deposits, this shroud would extend to the ground surface. When energized in the non-transferred mode, as is preferred, plasma arc 62 is established at the lowest point in borehole 57 and slowly raised to the top of the hole to gasify, pyrolyze, and melt a column of the surrounding earth and contaminants. Since the plasma torch is capable of creating temperatures in the range of 4000° C. to 7000° C., the heat produced gasifies and pyrolyzes all organic materials in the presence of steam in the soil immediately surrounding the borehole. It is preferred according to the subterranean embodiment disclosed to operate plasma torch 56 in the non-transferred arc mode.

The gases are collected at the top of the borehole 57 for treatment, as required, by standard gas treatment technology. A gas collection hood 61 is positioned over borehole 57 to channel the generated gas to a location for treatment. The inorganic materials and the soil are melted and, when allowed to cool, become a virtually unleachable and relatively nonporous, dense vitrified mass. This process of gasification, pyrolysis, melting and cooling, according to the invention, is done with an array of individual boreholes creating a group of treated columns which will coalesce together over the entire site (see FIG. 3) which contains the hazardous material.

As depicted in FIG. 2, the heat energy from plasma torch 56 radiates in a generally spherical pattern with the greatest degree of heat closest to plasma arc 62, and with the temperature lessening with greater distance from the plasma arc 62. Therefore, the area closest arc 62 is completely vitrified and the more distant portions of earth 66, 68 are heated to a lesser degree as will be described below.

Immediately beneath plasma arc 62, molten waste 64 generated at temperatures above 1100° C. accumulates in a pool. Beyond the distance to which sufficient heat for soil melting and vitrification has travelled, the curing zone 66 is subjected to sufficient heat (typically 900° C. or greater) to cure the earthen material into a bricklike hardness. The third zone in terms of distance from plasma arc 62 is a deplasticized zone 68 which is not cured, but has all liquid permanently removed therefrom by exposure of 200° C. or more and effectively becomes a rigid, non-absorbent envelope of soil. The distance to which heat will travel and effectively generate cured zone 66 and deplasticized zone 68 depends upon the power levels generated by plasma torch 56, the moisture content of the soil, and the nature of the surrounding contaminated earth 54 and uncontaminated earth 52.

The spacing between adjacent boreholes 57 is based in part on the nature of the contaminating materials and in part on the degree of soil vitrification and solidification required to contain, immobilize, and neutralize those materials.

As plasma arc torch 56 continues to generate heat energy, to melt portion 64 and to cure and deplasticize portions 66 and 68 respectively, torch 56 is gradually raised by appropriate mechanisms (not shown). The lifting mechanism for torch 56 is optionally either manually or automatically controlled. Movement of plasma arc torch 56 upwardly in borehole 57 melts and solidifies increasingly higher sections of contaminated earth 54 into a column until torch 56 reaches the top surface of the earth. The molten material 64 occupies substantially less volume than the soil from which it is formed due to the gasification of organic material, elimination of the water in the soil, and the densification caused by the vitrification process. This will result in a significant subsidence in the original ground surface surrounding the borehole 57 as shown in FIG. 2. Therefore, the result of the process is, after removal of the torch 56 and cooling of the molten material, a significantly reduced volume of hard, dense rock-like material in a subsided column encompassing the former borehole location.

The basic nature of a plasma arc torch is that of generating heat by electric arc as opposed to any sort of combustion. The process employed, therefore, does not require air or oxygen. The amount of plasma gas required to sustain an arc is on the order of 10 times less than the amount of air which is required to combust a fuel and generate similar amount of heat energy. Because of this lack of oxygen, even if air were to be the chosen plasma gas, no combustion of organic contaminants, such as petroleum spill products, is possible.

Figure 3:
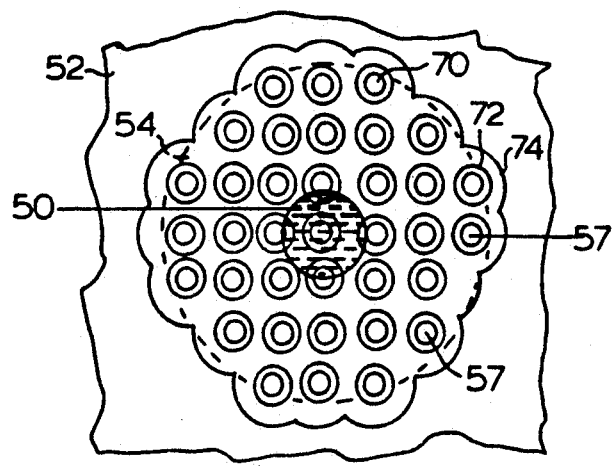
FIG. 3 is a top plan view of an area of a hazardous material spill showing a typical pattern of boreholes drilled at an extended spacing and the resultant coalesced columns of melted, solidified and devolatilized soil treated to immobilize and remediate the contamination.

To completely treat the area affected by the leaching into soil 54 of contaminant 50, an array of holes encompassing the area must be formed. A typical array is that shown in FIG. 3 which generally depicts a top plan view of the contaminated soil situation of FIGS. 1 and 2 after having been drilled and processed with plasma arc torch 56 as discussed above. In the approximate center of FIG. 3 is an illustrative surface hazardous waste spill 50 with contaminated area 54 indicated within a dashed line. The spacing of the boreholes 57 in the array of FIG. 3 is dependent upon the nature of the soil and the type of contaminant which is present. According to the method of the invention, an initial borehole 57 is drilled and processed with a plasma arc torch 56 so as to determine the actual maximum diameter which can be effectively decontaminated and remediated. The placement of successive boreholes 57 is such that sufficient overlapping of treated material occurs to remediate the entire affected area. In a typical drilling and heat treatment site with increased borehole spacing, cooled vitrified soil mass 70 is shown surrounded by cured brick-like zone 72 and deplasticized zone 74. The final result of the processed array of boreholes 57 is that at least all areas represented by deplasticized zone 74 are coalesced together so that all contaminated earthen material 54 is either gasified, pyrolyzed, vitrified or otherwise immobilized. This resultant remediated soil is no longer harmful and will protect against further spread of the hazardous spill.

Figure 4A:
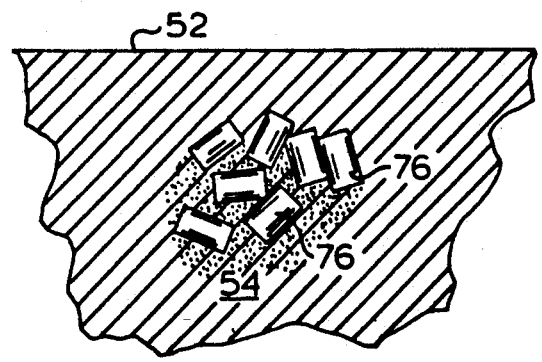
FIG. 4A is a sectional elevation view of an underground site containing buried drums of hazardous materials, with contaminated material radiating into the surrounding soil.

A relatively large spacing of boreholes 57 to coalesce the deplasticized zones as described above would be appropriate to treat and remediate soil contamination of simple organic volatile compounds such as petroleum products. The pyrolysis process would rapidly volatilize this contaminant out to the edge of the deplasticized zone 68 of FIG. 2 (temperatures greater than 200° C.). Medium borehole 57 spacing to coalesce the brick-like zone 66 of treated material (temperatures greater than 900° C.) should be considered for such contaminants as organic solids, sludges, or non-organic compounds of low toxicity. Finally, close spacing of boreholes 57 will be required to coalesce the thermally treated columns of the vitrified zone 64, which has been melted by heating to temperatures exceeding 1100° C. The contaminants required to be fully melted, vitrified and immobilized would include highly hazardous/toxic inorganic materials, such as heavy metals, low-level radioactive wastes, and underground deposits of unknown contaminants such as that found in unrecorded, buried metal drums 76 of waste (FIG. 4A). Over time, such buried drums are prone to rusting and leakage, causing an area of contaminated soil 54, as is illustrated.

A specific borehole spacing for a particular site remediation program would be ultimately determined by analysis of the results of an in-situ vitrification test in the medium to be remediated.

Figure 4B:
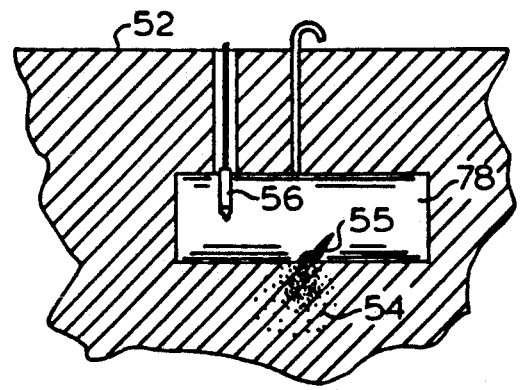
FIG. 4B is a sectional elevation view of an underground site having a subterranean liquid storage tank, with contaminated material radiating from a leak in the storage tank.

The invention also includes subterranean remediation capabilities unique to plasma arc torch processing of contaminated materials. Principal among these unique capabilities are the ability to operate at any depth underground, selective depth remediation of buried contaminants, and the remediation of contaminants located below the groundwater table. An example of selective remediation is the insertion of the plasma torch 56 directly into an underground storage tank 78 (FIG. 4B) which would readily remediate and volatilize all the residual petroleum products in the tank. If necessary, the plasma torch could be operated until the storage tank itself is melted and any surrounding contaminated soil 54, as would seep from break 55, is vitrified or otherwise remediated. The accompanying ground surface subsidence into the cavity of the storage tank would be backfilled with clean material.

Figure 6:
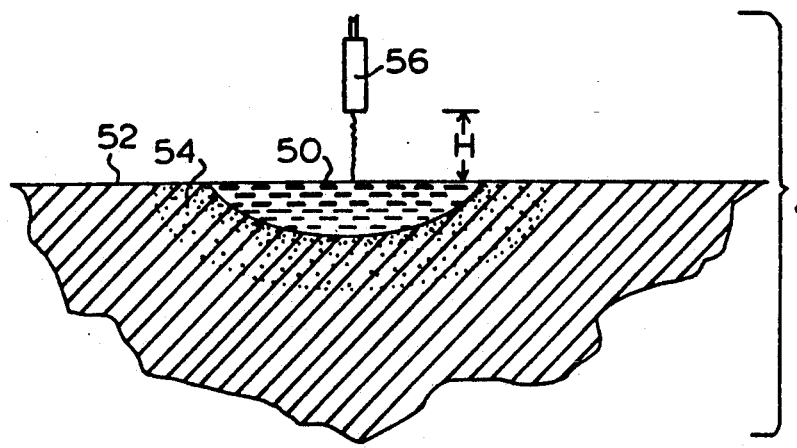
FIG. 6 is a sectional elevation view of a site of a hazardous liquid surface spill having leached into surrounding soil to a small extent and a plasma torch suspended above the spill site.

If the contaminant situation is one in which leaching has progressed no more than a small distance beneath the surface, e.g. 50 cm or less, it is not typically necessary to drill a hole. Thorough pyrolysis and vitrification can be accomplished with the plasma arc torch suspended a selected distance H above the ground surface, e.g., approximately 30 centimeters for a 1 MW plasma torch and radiating heat downwardly (see FIG. 6). In this surface application, the transferred arc torch mode would be the preferred remediation configuration. In the transferred arc mode, a second electrode (not shown) is driven into the ground in the vicinity of the spill to complete the electric circuit. This process is repeated at appropriately spaced locations until the entire spill is remediated. Whether operating above or below ground level, it is practical in many situations to utilize several torches simultaneously and reduce the total time required to remediate the hazardous deposit.

In certain situations, when a spilled or buried contaminant covers a very large area, is leaching rapidly or imminently threatening a water supply, it may be desirable to employ a second embodiment of the invention as described below. Correction of such a condition requires the first priority to be the creation of a barrier against further spreading of the seeping, contaminating leachate.

Figure 5:
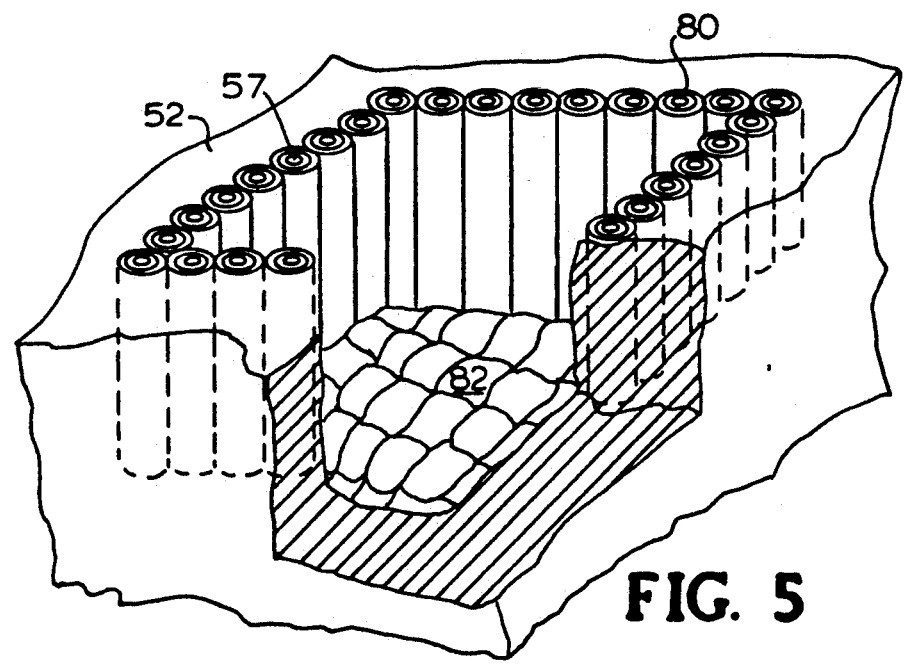
FIG. 5 is a perspective illustration of leachate cutoff walls and a containment basin established according to the present invention.

The initial steps of forming a borehole 57 to a depth shown in FIG. 2, inserting a thin metal casing (not shown), inserting and energizing a plasma arc torch 56 remain as described above. However, in order to treat an area as quickly as possible according to the second embodiment, plasma torch 56 is deenergized after pyrolyzing, melting and solidifying sections 64, 66 and 68 surrounding flame 62; torch 56 is then removed from borehole 57 without gradually being lifted and melting vertically up to the ground surface. Torch 56 is subsequently lowered into each of the other boreholes 57 illustrated in the array of FIG. 3 to be energized at or near the same depth so as to create a coalesced horizontal sealant layer 82 (FIG. 5) below the depth of the leaching contaminant which layer acts as a non-porous sealant to protect against further vertical leaching. After creation of this sealant layer 82 through treatment of the deepest portions of all holes 57, it may be desirable to reintroduce the plasma torch into each of the peripheral boreholes 57 so as to continue to pyrolyze, melt, and vitrify the soil from the level of the established horizontal sealant layer 82 up to the ground surface, thereby establishing one or more substantially vertical sealant cutoff walls of coalesced columns 80 from the horizontal containment layer up to the ground surface. The result is essentially a vitrified, impermeable set of cutoff walls or a complete sealed basin to prevent further leaching into surrounding soil 52. Following the creation of this barrier, the plasma torch could be reintroduced into the existing boreholes as a lower priority to remediate the entire volume of contaminated material.

As mentioned earlier, even if contaminants have reached the ground water table and are migrating out of the original contaminated area, plasma torch remediation still presents a viable solution. Plasma torches have been shown to work well underwater and at selective locations and depths. Therefore, once located, the contaminants migrating within the aquifer or underground stream could be readily pyrolyzed and vitrified along with the surrounding media and immobilized from further migration. In the case of any leached contaminant, it is essential to quickly determine the extent of spread of the contamination and to position boreholes 57 accordingly.

The plasma torch soil remediation process of the invention, because of the very high temperature created, will act to volatilize and pyrolyze the organic contaminants and generate gaseous by-products. The off-gases are collected by means of a hood 61 (FIG. 2) and scrubbed or chemically cleaned, as is known. Any residual carbon in the soil, together with the inorganic contaminants, would be melted into a slag which, when cooled, results in a high density, inert vitrified mass, which is not subject to leaching.

In summary, the process of the invention disclosed herein provides a highly reliable, efficient and environmentally safe method of remediating problems of soil contamination by intentional or accidental waste spills and deposits on or below the surface of the earth. The plasma arc torch method will pyrolyze, melt and vitrify any contaminated soil or rock material deposit or object and produce gaseous by-products according to the material being processed. Organic and inorganic materials, including heavy metals, can be processed and remediated at any depth or location underground, leaving an environmentally safe and chemically inert residue containing immobilized residual contaminants. Testing of the invention process in accordance with standards of the United States Environmental Protection Agency has demonstrated hazardous chemical levels in the inert residue lower than one-tenth the permissible concentration for leachability.

It is understood that the specific embodiments are used herein as examples and are not to be construed as limitations on the scope and principles of the invention.

What is claimed is:

1. A method for in-situ remediation and vitrification of hazardous waste contaminated soil comprising:
   (a) forming a vertical borehole of a size sufficient to accommodate a plasma arc torch extending from an upper surface of the soil to a lower end at a predetermined depth in said hazardous waste contaminated soil;
   (b) lowering a plasma arc torch together with connected utilities into said formed borehole and suspending the plasma arc torch at a location above and proximate said borehole lower end;
   (c) utilizing the connected plasma torch utilities to operate said torch to create a plasma arc of sufficient temperature to pyrolyze and melt substantially in the absence of combustion a portion of said contaminated soil located proximate said plasma arc;
   (d) deenergizing the plasma arc torch;
   (e) removing the plasma arc torch from the borehole; and
   (f) allowing said molten soil to cool and solidify thereby to produce a vitrified column of hard, inert residue substantially less in volume than the contaminated soil from which it was produced.

2. The method for in-situ remediation and vitrification of hazardous waste contaminated soil as claimed in claim 1 in which said borehole is formed to a depth greater than the depth of said contaminated soil.

3. The method for in-situ remediation and vibrification of hazardous waste contaminated soil as claimed in claim 1 including the step of inserting a heat destructible casing into said formed borehole prior to lowering said torch therein.

4. The method for in-situ remediation and vibrification of hazardous waste contaminated soil as claimed in claim 3 further comprising gradually raising said torch in said borehole so as to melt sequentially higher portions of contaminated soil.

5. The method for in-situ remediation and vitrification of hazardous waste contaminated soil as claimed in claim 3 in which said plasma arc torch operates to melt a portion of contaminated soil only at the lowest depth to which the borehole is formed and is then removed from said borehole, and such process is repeated in each of the plurality of boreholes so as to form a coalesced and non-porous horizontal sealant layer to prevent further vertical leaching of contaminants to surrounding soil and aquifers.

6. The method for in-situ remediation and vitrification of hazardous waste contaminated soil as claimed in claim 1 wherein said borehole is formed as an initial hole and further comprising lowering, operating, and raising said torch so as to determine from said initial hole the effective diameter of said decontaminated and vitrified soil and thereby to determine the distance required between said initial hole and a remaining plurality of holes in order to completely vitrify and remediate an area containing said hazardous waste contaminated soil.

7. The method for in-situ remediation and vitrification of hazardous waste contaminated soil as claimed in claim 6 further comprising forming a plurality of boreholes each at a distance from adjacent boreholes so that the peripheral diameters of solidified materials as determined from the initial hole will coalesce and form a solidified mass throughout the area containing said hazardous waste contaminated soil.

8. The method for in-situ remediation and vitrification of hazardous waste contaminated soil as claimed in claim 7 further including the step of positioning said plurality of boreholes in such relative proximity so that the heat transmitted from said plasma torch through said contaminated soil beyond the portion being melted creates peripheral zones of solidified brick-like material and deplasticized material and the outer deplasticized material of each hole is coalesced with the respective deplasticized material formed around adjacent boreholes.

9. The method for in-situ remediation and vitrification of hazardous waste contaminated soil as claimed in claim 1 including the step of operating said plasma torch in a non-transferred mode.

10. A method for in-situ remediation and vitrification of hazardous waste contaminated soil wherein the contamination extends to only a shallow depth below the surface of the soil, comprising:
    (a) suspending a plasma arc torch together with connected utilities above said contaminated soil;
    (b) utilizing the connected plasma torch utilities to operate said torch to create a plasma arc of sufficient temperature to melt substantially in the absence of combustion a portion of said contaminated soil located proximate said plasma arc;
    (c) deenergizing the plasma arc torch; and
    (d) allowing said molten mass to cool and solidify thereby to produce a volume of vitrified soil substantially less in volume than the contaminated soil from which it was produced.

11. The method for in-situ remediation and vitrification of hazardous waste contaminated soil as claimed in claim 10, further comprising moving said plasma arc torch to additional adjacent locations above said contaminated soil and remediating and vitrifying said additional adjacent locations of contaminated soil.

12. The method for in-situ remediation and vitrification of hazardous waste contaminated soil as claimed in claim 11 further comprising operating said torch in a transferred arc mode.

13. The method for in-situ remediation and vitrification of hazardous waste contaminated soil as claimed in claim 1 wherein said borehole is formed to a de substantially equal to the depth of said hazardous waste contaminated soil.

14. The method for in-situ remediation and vitrification of hazardous waste contaminated soil as claimed in claim 1 wherein said hazardous waste contaminated comprises volatile compounds and including forming throughout the contaminated area a plurality of boreholes each at a distance from adjacent boreholes and volatiz said volatile compounds in each of said boreholes.

15. The method for in-situ remediation and vitrification of hazardous waste contaminated soil as claimed in claim 1 further comprising forming a plurality of boreholes each at a distance from adjacent boreholes so that the peripheral diameters of solidif materials as determined from the initial hole will coalesce and form a solidified ma throughout the area containing said hazardous waste contaminated soil.

16. The method for in-situ remediation and vitrification of hazardous waste contaminated soil as claimed in claim 1 wherein said contaminated soil comprises having buried metal objects and including during the step of melting said soil the step melting said metal objects in situ.

17. The method for in-situ remediation and vitrification of hazardous waste contaminated soil as claimed in claim 1 wherein said contaminated soil comprises having buried metal objects containing volatile products and including during the step melting said soil the step of melting said metal objects in situ and volatilizing the said volatile products contained therein.

18. The method for in-situ remediation and vitrification of hazardous waste contaminated soil as claimed in claim 1 in which said plasma arc torch operates to m a portion of contaminated soil only at the lowest depth to which the borehole is form and is then removed from said borehole, and such process is repeated in each of the plurality of boreholes so as to form a coalesced and non-porous horizontal sealant layer to prevent further vertical leaching of contaminants to surrounding soil and aquifers.

* * * * *

UNITED STATES PATENT AND TRADEMARK OFFICE
CERTIFICATE OF CORRECTION

PATENT NO. : 5,276,253

DATED : January 4, 1994

INVENTOR(S) : Louis J. Circeo, Jr., et al.

It is certified that error appears in the above-identified patent and that said Letters Patent is hereby corrected as shown below:

On title page, item [56] "U.S. Patent Documents" after "Brouns et al.", insert --405/258--; and after "Manchack, Jr.", insert --175/50--.

Column 3, line 53, correct "maybe" to read --may be--.

Column 8, line 25, correct "vibrification" to read --vitrification--.

Column 8, line 30, correct "vibrification" to read --vitrification--.

Column 9, line 42, correct "de" to read --depth--.

Column 10, line 5, after "contaminated" add --soil--.

Column 10, line 7, after "contaminated" add --soil--.

Column 10, line 9, correct "volatiz" to read --volatizing--.

Column 10, line 15, correct "solidif" to read --solidified--.

Column 10, line 17, correct "ma" to read --mass--.

Column 10, line 23, after "step" add --of--.

Column 10, line 29, after "step" add --of--.

Column 10, line 34, correct "m" to read --melt--.

UNITED STATES PATENT AND TRADEMARK OFFICE
CERTIFICATE OF CORRECTION

PATENT NO. : 5,276,253
DATED     : January 4, 1994
INVENTOR(S) : Louis J. Circeo, Jr., et al It is certified that error appears in the above-indentified patent and that said Letters Patent is hereby corrected as shown below:

Column 10, line 36, correct "form" to read --formed--.

Signed and Sealed this

Third Day of May, 1994

*Attest:*

BRUCE LEHMAN

*Attesting Officer*     Commissioner of Patents and Trademarks